United States Patent [19]

Chen et al.

[11] Patent Number: 4,740,292

[45] Date of Patent: Apr. 26, 1988

[54] CATALYTIC CRACKING WITH A MIXTURE OF FAUJASITE-TYPE ZEOLITE AND ZEOLITE BETA

[75] Inventors: Nai Y. Chen, Titusville; Anthony Y. Kam, Cherry Hill, both of N.J.; Clinton R. Kennedy, Talleyville, Del.; Anil B. Ketkar, Trenton, N.J.; Donald M. Nace, Woodbury, N.J.; Robert A. Ware, Deptford, N.J.

[73] Assignee: Mobil Oil Corporation, New York, N.Y.

[21] Appl. No.: 919,621

[22] Filed: Oct. 15, 1986

Related U.S. Application Data

[63] Continuation of Ser. No. 775,189, Sep. 12, 1985, abandoned, which is a continuation-in-part of Ser. No. 686,762, Dec. 27, 1984, abandoned.

[51] Int. Cl.$^4$ ............................................. C10G 11/02
[52] U.S. Cl. .................................................... 208/120
[58] Field of Search ........................ 208/120, 120 MC

[56] References Cited

U.S. PATENT DOCUMENTS

| | | |
|---|---|---|
| Re. 28341 | 2/1975 | Wadlinger et al. ................ 208/120 |
| Re. 28398 | 4/1975 | Chen et al. ......................... 208/111 |
| 3,140,251 | 7/1964 | Plank et al. ........................ 208/120 |
| 3,140,252 | 7/1964 | Frilette et al. ..................... 208/120 |
| 3,140,253 | 7/1964 | Plank et al. ........................ 208/120 |
| 3,149,249 | 7/1964 | Plank et al. ........................ 208/120 |
| 3,236,761 | 2/1966 | Rabo et al. ......................... 208/120 |
| 3,271,418 | 9/1966 | Plank et al. ........................ 208/120 |
| 3,293,192 | 12/1966 | Maher et al. ......................... 502/60 |
| 3,308,069 | 3/1967 | Wadlinger et al. .................. 502/60 |
| 3,449,070 | 6/1969 | McDaniel et al. .................... 502/60 |
| 3,668,113 | 6/1972 | Burbidge et al. .................. 208/97 |
| 3,755,138 | 8/1973 | Chen et al. ......................... 208/33 |
| 3,758,402 | 9/1973 | Oleck et al. ........................ 208/111 |
| 3,758,403 | 9/1973 | Rosinski et al. ............. 208/120 MC |
| 3,769,202 | 10/1973 | Plank et al. .................. 208/111 MC |
| 3,804,747 | 4/1974 | Kimberlin et al. ................ 208/120 |
| 3,894,931 | 7/1975 | Nace et al. ......................... 208/73 |
| 3,894,933 | 7/1975 | Owen et al. ......................... 208/77 |
| 3,894,934 | 7/1975 | Owen et al. ......................... 208/78 |
| 3,894,938 | 7/1975 | Gorring et al. ....................... 208/97 |
| 3,923,641 | 12/1975 | Morrison ........................... 208/111 |
| 4,016,218 | 4/1977 | Haag et al. .......................... 585/467 |
| 4,097,410 | 6/1978 | Gladrow .............................. 208/120 |
| 4,309,279 | 1/1982 | Chester et al. ...................... 208/120 |
| 4,309,280 | 1/1982 | Rosinski et al. .................... 208/120 |
| 4,419,220 | 12/1983 | LaPierre et al. ................... 208/111 |
| 4,430,200 | 2/1984 | Shihabi ........................ 208/120 MC |
| 4,477,336 | 10/1984 | Scherzer ...................... 208/120 MC |
| 4,486,296 | 12/1984 | Oleck et al. ................. 208/111 MC |
| 4,501,926 | 2/1985 | La Pierre et al. ................... 208/120 |

OTHER PUBLICATIONS

*The Oil and Gas Journal*, Jan. 6, 1975, pp. 69–73, Bennett et al., "New Process Produces Low-Pour Oils".
*Journal of Catalysis*, vol. VI, pp. 278–287 (1966), Miale et al., "Catalysis by Crystalline Aluminosilicates".
Breck, *Zeolite Molecular Sieves*, John Wiley and Sons, pp. 92–107, 218, 274, 507–522, 527–528 (1984).
Gary et al., Chapters 7–9, *Petroleum Refining*, Marcel Dekker Inc., pp. 86–141 (1976).
Venuto et al., *Fluid Catalytic Cracking with Zeolite Catalysts*, Marcel Dekker Inc., pp. 30–145 (1979).
Pine et el., "Prediction of Cracking Catalyst Behavior by a Zeolite Unit Cell Size Model", *J. Catal.*, vol. 85, No. 2 (1984), pp. 466–476.
Magee et al., "Chapter 11—Preparation and Performance of Zeolite Cracking Catalysts", *Zeolite Chemistry and Catalysis*, pp. 615–679 (1976).
Gates et al., *Chemistry of Catalytic Processes*, pp. 78–89 (1979), McGraw—Hill Book Co.

*Primary Examiner*—Helen M. S. Sneed
*Assistant Examiner*—Anthony McFarlane
*Attorney, Agent, or Firm*—Alexander J. McKillop; Michael G. Gilman; Malcolm D. Keen

[57] ABSTRACT

Heavy oils are simultaneously subjected to cracking and dewaxing in the absence of added hydrogen using a catalyst comprising Zeolite Beta and an X or Y or other faujasite zeolite. The process is able to effect a bulk conversion of the oil, while, at the same time, yielding a higher octane gasoline, increased yields of $C_3$ and $C_4$ olefins, and a low pour point distillate product.

34 Claims, 5 Drawing Sheets

CATALYTIC CRACKING WITH A MIXTURE OF FAUJASITE-TYPE ZEOLITE AND ZEOLITE BETA

CROSS-REFERENCE TO RELATED APPLICATIONS

This is a continuation of copending application Ser. No. 775,189, filed on Sept. 12, 1985, abandoned, which is a continuation-in-part of U.S. patent application Ser. No. 686,762, filed Dec. 27, 1984 abandoned.

BACKGROUND OF THE INVENTION

1. Field of the Invention

This invention relates to improvements in catalytic cracking of hydrocarbon oils and, in particular, is directed to a process for the catalytic cracking of hydrocarbon oils to produce higher gasoline and distillate yields, increase gasoline octane number and reduce the product pour point of the distillates. The cracking catalyst used is a mixture of Zeolite Beta with a conventional faujasite-type zeolite-containing cracking catalyst, such as zeolite Y. The cracking process takes place in the absence of added hydrogen.

2. The Prior Art

Catalytic cracking of hydrocarbon oils utilizing crystalline zeolites is a known process, practiced, for example, in fluid-bed catalytic cracking (FCC) units, moving bed or thermorfor catalytic cracking (TCC) reactors and fixed bed crackers. Crystalline zeolites have been found to be particularly effective for the catalytic cracking of a gas oil to produce motor fuels, and have been described and claimed in many patents, including U.S. Pat. Nos. 3,140,249; 3,140,251; 3,140,252; 3,140,253; and 3,271,418. It is also known in the prior art to incorporate the crystalline zeolite into a matrix for catalytic cracking, and such disclosure appears in one or more of the above-identified U.S. patents.

It is also known that improved results will be obtained with regard to the catalytic cracking of gas oils if a crystalline zeolite having a pore size of less than 7 Angstrom units is included with a crystalline zeolite having a pore size greater than 8 Angstrom units, either with or without a matrix. A disclosure of this type is found in U.S. Pat. No. 3,769,202. Although the incorporation of a crystalline zeolite having a pore size of less than 7 Angstrom units into a catalyst composite comprising a large pore size crystalline zeolite (pore size greater than 8 Angstrom units) has indeed been very effective with respect to raising the octane number; nevertheless, it did so at the expense of the overall yield of gasoline.

Improved results in catalytic cracking with respect to both octane number and overall yield were achieved in U.S. Pat. No. 3,758,403. In the '403 patent, the cracking catalyst comprised a large pore size crystalline zeolite (pore size greater than 7 Angstrom units) in admixture with a ZSM-5 type zeolite, wherein the ratio of ZSM-5 type zeolite to large pore size crystalline zeolite was in the range of 1:10 to 3:1. Effective cracking processes were disclosed as being achieved when the catalyst was used to obtain the inherent advantages realized in moving bed techinques, such as the Thermofor Catalytic Cracking Process (TCC), as well as in fluidized cracking processes (FCC).

The use of ZSM-5 type zeolite in conjunction with a zeolite cracking catalyst of the X or Y faujasite variety is described in U.S. Pat. Nos. 3,894,931; 3,894,933; and 3,894,934. The two former patents disclose the use of a ZSM-5 type zeolite in amounts of about 5-10 wt %; the later patent discloses the weight ratio of ZSM-5 type zeolite to large pore size crystalline zeolite within the range of 1:10 to 3:1.

The addition of a separate additive or composite catalyst comprising one or more members of the ZSM-5 type has been found to be extremely efficient as an octane and total yield improver, when used in very small amounts, in conjunction with a conventional cracking catalyst. Thus, in U.S. Pat. No. 4,309,279, it was found that only 0.1 to 0.5 wt % of a ZSM-5 type catalyst, added to a conventional cracking catalyst under conventional cracking operations, could increase octane by about 1-3 RON+O (Research Octane Number Without Lead).

U.S. Pat. No. 4,309,280 also teaches ZSM-5 and other zeolites in conjunction with a conventional cracking catalyst.

SUMMARY OF THE INVENTION

In accordance with the present invention, there has now been discovered an improved process for upgrading total yield and octane number of gasoline boiling range product, improving distillate quality and producing a middle distillate liquid product of satisfactory pour point and cloud point and increased gasoline plus distillate yield. This desirable result is obtained by the use of a catalyst composition comprising Zeolite Beta and one or more faujasite-type zeolites. Faujasite-type zeolites are well-known in the art and include rare earth-exchanged zeolite X (REX) or Y (REY), ultrastable zeolite Y (USY), the acid form of zeolite Y (HY), or other natural or synthetic faujasite zeolites. A more thorough description of faujasite-type zeolites may be found in Chapter 2 of Breck, Donald W., *Zeolite Molecular Sieves*, Robert E. Krieger Publishing Co., Malabar, Fla., 1984, with specific reference to pages 92–107.

The hydrocarbon feedstock is heated with the catalyst composition under conversion conditions which are appropriate for cracking. External hydrogen is not added during the cracking process. During conversion, the aromatics and naphthenes which are present in the feedstock undergo cracking reactions, such as dealkylation, isomerization and ring opening. Additionally, paraffins in the feedstock crack and/or isomerize to lower molecular weight species. The reduction in paraffin molecular weight results in a dewaxing effect. The dewaxing occurs together with the cracking during conversion and may occur simultaneously.

The process enables heavy feedstocks, such as gas oils boiling above 420° F., to be converted to gasoline range products boiling below 420° F. and distillates in the 420°–650° F. range. Use of the catalyst composition of this invention results in improved cracking activity over the base catalyst, increased octane numbers of the product gasoline and increased gasoline plus alkylate yield relative to faujasite-type zeolites alone. Further, the addition of Zeolite Beta to a faujasite-type base catalyst results in about the same distillate selectivity at high (70%) conversion, improved distillate quality and reduced pour and cloud points, compared to similar catalysts containing only faujasite-type zeolites.

DESCRIPTION OF PREFERRED EMBODIMENTS

Catalysts

Figure 1:
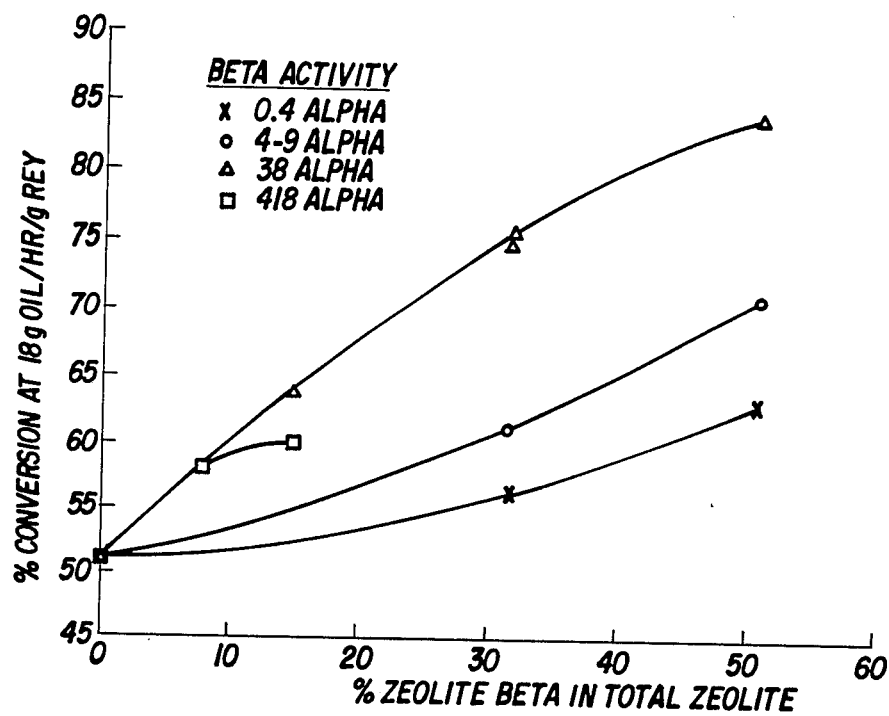
FIG. 1 is a plot illustrating the gain in activity (% conversion) over a standard faujasite-type catalyst by the addition of Zeolite Beta.

As mentioned above, the present hydrocarbon conversion process combines elements of cracking and dewaxing. The catalyst used in the process comprises Zeolite Beta and a faujasite-type zeolite, such as REX or REY, USY, HY, or other natural or synthetic faujasites. Further, it is well known that the state-of-the-art Thermofor Catalytic Cracking (TCC) catalysts and Fluidized Catalytic Cracking (FCC) catalyst contain a faujasite-type zeolite catalyst, such as zeolite REY, as the active cracking component. It has now been found that addition of Zeolite Beta to the TCC and FCC catalyst substantially improves the performance of these catalysts. Zeolite Beta is described in U.S. Pat. Nos. 3,308,069 and Re. 28,341, which are incorporated herein by reference.

Zeolite Beta is a crystalline aluminosilicate having a pore size greater than 5 Angstroms. The composition of the zeolite, as described in U.S. Pat. Nos. 3,308,069 and Re. 28,341, in its as-synthesized form may be expressed as follows:

[XNa(1.0±0.1−X)TEA]AlO₂.YSiO₂.WH₂O 

where X is less than 1, preferably less than 0.7; TEA represents the tetraethylammonium ion; Y is greater than 5 but less than 100; and W is up to about 60 (it has been found that the degree of hydration may be higher than originally determined, where W was defined as being up to 4), depending on the degree of hydration and the metal cation present. The TEA component is calculated by differences from the analyzed value of sodium and the theoretical cation to structural aluminum ratio of unity.

In the fully base-exchanged form, Zeolite Beta has the composition:

[(X/n)M(1±0.1−X)H].AlO₂.YSiO₂.WH₂O 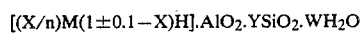

where X, Y and W have the values listed above and n is the valence of the metal M.

In the partly base-exchanged form, which is obtained from the initial sodium form of the zeolite by ion-exchange without calcining, Zeolite Beta has the formula:

[(X/n)M(1±0.1−X)TEA]AlO₂.YSiO₂.WH₂O 

When it is used in the present catalysts, the zeolite is at least partly in the hydrogen form in order to provide the desired acidic functionality for the cracking reactions which are to take place. The zeolite's acidic functionality can be characterized by an alpha value. The alpha value, a measure of zeolite acidic functionality, is described, together with details of its measurement, in U.S. Pat. No. 4,016,218 and J. Catalysis, Vol. VI, pages 278-287 (1966), and reference is made to these for such details. Larger alpha values correspond to a more active catalyst. The acidic functionality may be controlled by base exchange of the zeolite, especially with alkali metal cations, such as sodium, by steaming or by control of the silica-to-alumina ratio of the zeolite.

When synthesized in the alkali metal form, Zeolite Beta may be converted to the hydrogen form, by formation of the intermediate ammonium form, as a result of ammonium ion-exchange and calcination of the ammonium form to yield the hydrogen form. In addition to hydrogen form, other forms of the zeolite wherein the original alkali metal content has been reduced may be used. Thus, the original alkali metal of the zeolite may be replaced by ion-exchange with the other suitable metal cations, including, by way of, for example, copper, zinc, calcium or rare earth metals.

Zeolite Beta, in addition to possessing a composition as defined above, may also be characterized by its X-ray diffraction data, which are set out in U.S. Pat. Nos. 3,308,069 and Re. 28,341. The significant d values (Angstroms, radiation: K alpha doublet of copper, Geiger counter spectrometer) are shown in Table 1 below:

TABLE 1 d Values of Reflections in Zeolite Beta 11.40±0.2
7.40±0.2
6.70±0.2
4.25±0.1
3.97±0.1
3.00±0.1
2.20±0.1

The preferred forms of Zeolite Beta for use in the present process are the high silica forms, having silica-to-alumina mole ratio of at least 10:1, and preferably in the range of 20:1 to 50:1 in the as-synthesized form. It has been found, in fact, that Zeolite Beta may be prepared with silica-to-alumina mole ratios above the 200:1 maximum specified in U.S. Pat. Nos. 3,308,069 and Re. 28,341, and these forms of the zeolite perform well in the process. Ratios of 50:1, or even higher, e.g., 250:1, 500:1, may be used. The silica-to-alumina mole ratio of the zeolite in its as-synthesized form may be increased by techniques such as steaming and other dealuminization methods, and a certain measure of dealuminization will take placing during use under the influence of the hydrothermal conditions encountered during the catalytic cracking cycle.

The silica-to-alumina ratios referred to in this specification are the structural or framework ratios, that is, the ratio of the $SiO_4$ to the $AlO_4$ tetrahedra, which together constitute the structure of which the zeolite is composed. It should be understood that this ratio may vary from the silica-to-alumina ratio determined by various physical and chemical methods. For example, a gross chemical analysis may include aluminum which is present in the form of cations associated with the acidic sites on the zeolite, thereby giving a low silica-to-alumina ratio. Similarly, if the ratio is determined by the thermogravimetric analysis (TGA) of ammonia desorption, a low ammonia titration may be obtained if cationic aluminum prevents exchange of the ammonium ions onto the acidic sites. These disparities are particularly troublesome when certain treatments, such as the dealuminization method described below which result in the presence of ionic aluminum free of the zeolite structure, are employed. Due care should therefore be taken to ensure that the framework silica-to-alumina ratio is correctly determined.

The silica-to-alumina ratio of the zeolite may be determined by the nature of the starting materials used in its preparation and their quantities relative one to another. Some variation in the ratio may therefore be obtained by changing the relative concentration of the silica precursor relative to the alumina precursor, but definite limits in the maximum obtainable silica-to-alumina ratio of the zeolite may be observed. For Zeolite Beta, this limit is usually about 100:1 (although higher ratios may be obtained), and for ratios above this value, other methods are usually necessary for preparing the desired high silica zeolite. One such method comprises dealuminization by extraction with acid, and this method is disclosed in detail in U.S. patent application Ser. No. 379,399, filed May 18, 1983 by R. B. LaPierre and S. S. Wong, entitled "High Silica Zeolite Beta", and reference is made to this application for additional details of the method.

Briefly, the method comprises contacting the zeolite with an acid, preferably a mineral acid such as hydrochloric acid. The dealuminization proceeds readily at ambient and mildly elevated temperatures and occurs with minimal losses in crystallinity to form high silica forms of Zeolite Beta with silica-to-alumina ratios of at least 100:1, with ratios of 200:1 or even higher being readily attainable.

The zeolite is conveniently used in the hydrogen form for the dealuminization process, although other cationic forms may also be employed, for example, the sodium form. If these other forms are used, sufficient acid should be employed to allow for the replacement by protons of the original cations in the zeolite. The amount of zeolite in the zeolite/acid mixture should generally be from 5 to 60 wt %.

The acid may be a mineral acid, i.e., an inorganic acid or an organic acid. Typical inorganic acids which can be employed include mineral acids, such as hydrochloric, sulfuric, nitric and phosphoric acids, peroxydisulfonic acid, dithionic acid, sulfamic acid, peroxymonosulfuric acid, amidodisulfonic acid, nitrosulfonic acid, chlorosulfuric acid, pyrosulfuric acid, and nitrous acid. Representative organic acids which may be used include formic acid, trichloroacetic acid, and trifluoroacetic acid.

The concentration of added acid should be such as not to lower the pH of the reaction mixture to an undesirably low level, which could effect the crystallinity of the zeolite undergoing treatment. The acidity which the zeolite can tolerate will depend, at least in part, upon the silica-to-alumina ratio of the starting material. Generally, it has been found that Zeolite Beta can withstand concentrated acid without undue loss in crystallinity, but, as a general guide, the acid will be from 0.1N to 4.0N, usually 1 to 2N. These values hold good regardless of the silica-to-alumina ratio of the Zeolite Beta starting material. Stronger acids tend to effect a relatively greater degree of aluminum removal than weaker acids.

The dealuminization reaction proceeds readily at ambient temperatures, but mildly elevated temperatures may be employed, e.g., up to boiling. The duration of the extraction will affect the silica-to-alumina ratio of the product, since extraction, being diffusion controlled, is time dependent. However, because the zeolite becomes progressively more resistant to loss of crystallinity as the silica-to-alumina ratio increases, i.e., it becomes more stable as the aluminum is removed, higher temperatures and more concentrated acids may be used towards the end of the treatment than at the beginning without the attendant risk of losing crystallinity.

After the extraction treatment, the product is water-washed free of impurities, preferably with distilled water, until the effluent wash water has a pH within the approximate range of 5 to 8.

The crystalline dealuminized products obtained by the method of this invention have substantially the same crystallographic structure as that of the starting aluminosilicate zeolite, but with increased silica-to-alumina ratios. The formula of the dealuminized Zeolite Beta will therefore be:

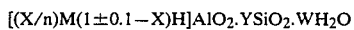

$$[(X/n)M(1\pm0.1-X)H]AlO_2.YSiO_2.WH_2O$$

where X is less than 1, preferably less than 0.75, Y is at least 100, preferably at least 150, and W is up to 60. M is a metal, preferably a metal of Groups IA, IB, IIA, IIB, IIIA, rare earths, or a mixture of metals. The silica-to-alumina ratio, Y will generally be in the range of 100:1 to 500:1. The X-ray diffraction pattern of the dealuminized zeolite will be substantially the same as that of the original zeolite, as set out in Table 1 above.

If desired, the zeolite may be steamed prior to acid extraction so as to increase the silica-to-alumina ratio and render the zeolite structure more stable to the acid. The steaming may also serve to increase the ease with which the alumina is removed and to promote the retention of crystallinity during the extraction procedure. Steaming in and of itself may be sufficient to increase the desired silica-to-alumina ratio.

Prior to use, the zeolite should be dehydrated at least partially. This can be done by heating to a temperature in the range of 400° to 1100° F. in air or an inert atmosphere, such as nitrogen, for 1 to 48 hours. Dehydration can also be performed at lower temperatures merely by using a vacuum, but a longer time is required to obtain a sufficient amount of dehydration.

As stated previously, another component of the catalyst mixture of this invention is a faujasite-type zeolite, such as REX, REY, USY, or other natural or synthetic faujasite zeolites.

The X or Y zeolites or other faujasite materials used in the instant invention usually have the original cations associated therewith replaced by a wide variety of other cations according to techniques well known in the art. Typical replacing cations would include hydrogen, ammonium and metal cations, including mixtures of the same. Of the replacing metallic cations, particular preference is given to cations of ammonium, hydrogen, rare earths, $Mg^{++}$, $Zn^{++}$, $Ca^{++}$, and mixtures thereof.

Typical ion-exchange techinques would be to contact the particular zeolite with a solution of a salt of the desired replacing cation or cations. Although a wide variety of salts can be employed, particular preference is given to chloride, nitrates and sulfates.

As noted above, a zelite which may be used is USY. The ultrastable zeolites disclosed herein are well known to those skilled in the art. For example, they are described at pages 507–519 of the book *Zeolite Molecular Sieves* by Donald W. Breck, supra, and are exemplified in U.S. Pat. Nos. 3,293,192 and 3,449,070. These two patents and the Breck reference above are incorporated herein by reference. These low sodium, ultrastable zeolites are available commercially from the W. R. Grace & Co.

It may be desirable to incorporate the zeolites into a material resistant to the temperature and other conditions employed in the process. Such matrix materials include synthetic and naturally occurring substances, such as inorganic materials, e.g., clay, silica and metal oxides. The latter may be either naturally occurring or in the form of gelatinous precipitates or gels, including mixtures of silica and metal oxides. Naturally occurring clays can be composited with the zeolites, including those of the montmorillonite and kaolin families. These clays can be used in the raw state as originally mined or initially subjected to calcination, acid treatment or chemical modification.

The zeolites may be composited with a porous matrix material, such as alumina, silica-alumina, silica-magnesia, silica-zirconia, silica-thoria, silica-berylia, silica-titania, as well as ternary compositions such as silica-alumina-thoria, silica-alumina-zirconia, magnesia and silica-magnesia-zirconia. The matrix may be in the form of a cogel. The relative proportions of zeolite component and inorganic oxide gel matrix on an anhydrous basis may vary widely with the zeolite content ranging from 5 to 99, more usually 10 to 65, wt % of the dry composite. The matrix itself may possess catalytic properties, generally of an acidic nature, and may be impregnated with a combustion promoter, such as platinum, to enhance a carbon monoxide combustion.

The particular proportion of the zeolite component to the other in the catalyst is not narrowly critical and can vary over a wide range. However, for most purposes, the weight ratio of the faujasite-type zeolite to Zeolite Beta is important and must be fully maintained. For example, when the catalyst is used for cracking and dewaxing purposes, the weight ratio of the faujasite-type zeolite and Zeolite Beta can range from 1:25 to 3:1, preferably 1:5 to 2:1, and still more preferably from 1:4 to 1:1. When the catalyst is used for cracking and improving the octane number of the gasoline product, a faujasite-type zeolite to Zeolite Beta ratio may range from 1:2 to 20:1, with a ratio of higher than 1:1 being preferably utilized.

A most preferred embodiment of this invention resides in the use of a porous matrix together with the two types of zeolites previously described. Therefore, the most preferred class of catalysts falling within the scope of this invention would include a system containing a zeolite of the Beta type, and a zeolite of the X or Y type, which are combined, dispersed or otherwise intimately admixed or composited with a porous matrix in such proportions that the resulting product contains 1 to 95 wt %, and preferably 10 to 70 wt % of the total zeolites in the final composite. In a moving bed process, the use of a composite catalyst is preferred; but in a fluid process, a mixture is satisfactory.

The octane efficiency of the catalytic cracking process, that is, the octane gain relative to the yield loss, will vary according to a number of factors, including the nature of the feedstock, the conversion level and the relative proportions and activities of the catalysts. Added to this is the fact that the catalysts may age at different rates so that a process may drift from optimum values as it progresses, unless measures are taken to correct this, for example, by addition of fresh catalyst of one type or another. In an FCC process using the two zeolites on separate catalyst particles, i.e., a mixture of the catalysts, the differential aging effect can be readily compensated by adding make-up catalyst of one type or another, e.g., more Zeolite Beta, if this is found to age more quickly. In a moving bed process, however, which will generally use composite catalyst beads, i.e., catalyst particles containing both zeolites in each particle, this expedient cannot readily be employed. In such cases, it may be necessary to vary the feed or another variable of the process, such as temperature or severity. The octane efficiency may pass through a maximum value at certain values of the faujasite:Zeolite Beta ratio or of the activity ratio between the two catalysts. If this does occur, it will be possible to optimize either the content of the two zeolites in the catalyst as a whole, or their respective activities (or both), by altering the proportion of the cracking catalyst to the Zeolite Beta catalyst so as to obtain the greatest octane improvement relative to the yield loss. In many cases, conventional faujasite cracking catalysts will give a maximum in the octane efficiency at zeolite loadings from about 60:40 to 30:70 (faujasite:Zeolite Beta) at the activity ratios conventionally encountered.

Feedstock

The feedstock for the present conversion process comprises a heavy hydrocarbon oil, such as a gas oil, coker tower bottoms fraction reduced crude, vacuum tower bottoms, deasphalted vacuum resids, FCC tower bottoms, cycle oils. Oils derived from coal, shale or tar sands may also be treated in this way. Oils of this kind generally boil about 650° F. (343° C.), although this process is also useful with oils which have initial boiling points as low as 500° F. (260° C.). These heavy oils comprise high molecular weight long-chain paraffins and high molecular weight aromatics with a large proportion of fused ring aromatics. The heavy hydrocarbon oil feedstock will normally contain a substantial amount boiling above 450° F. and will normally have an initial boiling point of about 550° F. (288° C.), more usually about 650° F. (343° C.). Typical boiling ranges will be about 650° to 1050° F. (566° C.), or about 650° to 950° F. (510° C.), but oils with a narrower boiling range may, of course, be processed; for example, those with a boiling range of about 650° to 850° F. (454° C.). Heavy gas oils are often of this kind, as are cycle oils and other nonresidual materials. It is possible to co-process materials boiling below 500° F., but the degree of conversion will be lower for such components. Feedstocks containing lighter ends of this kind will normally have an initial boiling point above about 300° F.

The present process is of particular utility with highly paraffinic feeds because, with feeds of this kind, the greatest improvement in pour point may be obtained. However, benefits will also be observed with non-waxy feeds.

Process Conditions

The processing is carried out under conditions similar to those used for conventional catalytic cracking. Process temperatures of 750° to 1200° F. may conveniently be used, although temperatures above 1050° F. will normally not be employed. Generally, temperatures of 840° to 1050° F. (449°–566° C.) will be employed. The space velocity of the feedstock will normally be from 0.1 to 20 LHSV, preferably 0.1 to 10 LHSV.

The conversion may be conducted by contacting the feedstock with a fixed stationary bed of catalyst, a fixed fluidized bed or with a transport bed. The catalyst may be regenerated by burning in air or other oxygen-containing gas.

A preliminary hydrotreating step to remove nitrogen and sulfur and to saturate aromatics to naphthenes without substantial boiling range conversion will usually improve catalyst performance and permit lower tempertures, higher space velocities, or combinations of these conditions to be employed.

The improved process of this invention is illustrated by the following Examples. All parts and proportions in these Examples are by weight unless stated to the contrary.

EXAMPLE 1

Example 1 illustrates the activity advantage of a separate particle mixture of Zeolite Beta with REY over REY alone in a fixed bed reactor. Gippsland gas oil (properties listed in Table 2 following) was passed over equilibrium TCC bead catalysts mixed with varying weight percents of the hydrogen form of Zeolite Beta contained in an $Al_2O_3$ binder.

TABLE 2

| Gippsland Gas Oil Properties | |
|---|---|
| API Gravity | 33.8 |
| Pour Point, °F. | 105 |
| Conradson Carbon, wt % | 0.13 |
| Kin. Viscosity at 100° C., cs | 3.0 |
| Aniline Point, °F. | 202.5 |
| Bromine Number | 1.7 |
| Refractive Index at 70° C. | 1.4538 |
| Hydrogen, wt % | 13.67 |
| Sulfur, wt % | 0.15 |
| Nitrogen, ppm | 180 |
| Nickel, ppm | 0.14 |
| Vanadium, ppm | 0.10 |
| Iron, ppm | 2.0 |
| Copper, ppm | *0.1 |
| Molecular Weight | 313 |
| Paraffins, wt % | 62.9 |
| Mono Naphthenes | 1.6 |
| Poly Naphthenes | 10.7 |
| Aromatics | 24.7 |
| Distillation (D1160) | |

TABLE 2-continued

| Gippsland Gas Oil Properties | |
|---|---|
| IBP | 401° F. |
| 5% | 537 |
| 10% | 589 |
| 30% | 693 |
| 50% | 745 |
| 70% | 789 |
| 90% | 855 |
| 95% | 886 |
| EP % | 905 |

*Less Than

The alpha activity of the Zeolite Beta varied between 0.4 and 418, depending upon the following conditions:

| | Catalyst No. | | | | |
|---|---|---|---|---|---|
| | 1 | 2 | 3 | 4 | 5 |
| Catalyst Preparation Ratio, Zeolite Beta/$Al_2O_3$ | 50/50 | 50/50 | 65/35 | 50/50 | 50/50 |
| Steam Conditions | | | Unsteamed | | |
| Temperature, °F. | — | 1000 | 1100 | 1100 | 1300 |
| Time, hrs. | — | 16 | 70 | 70 | 9 |
| Pressure, psig | — | 0 | 0 | 0 | 40 |
| Zeolite Alpha | 418 | 38 | 9 | 4 | 0.4 |

The results, as illustrated in FIG. 1, indicate a substantial activity gain over the standard commercial TCC catalyst beads (0 wt % Zeolite Beta) with the addition of small amounts of Zeolite Beta. The catalysts comprising Zeolite Beta with alpha value greater than 38 show similar activity gains. Although the activity gain for catalysts comprising Zeolite Beta with an alpha value of 4 and 9 is smaller, the activity is still substantially improved over the standard catalyst.

EXAMPLE 2

Example 2 demonstrates activity advantages with Zeolite Beta in fluid catalyst form. Gippsland gas oil was cracked in a fluid bed unit using zeolite REY, a physical mixture of Zeolite Beta and REY, and Zeolite Beta alone. The results are shown in Table 3.

TABLE 3

| Catalyst | REY | 4:1 wt mixture Beta & REY | Beta |
|---|---|---|---|
| Temperature, °F. | 932 | 932 | 941 |
| LHSV (Based on Zeolite) | 0.50 | 0.58 | 0.50 |
| 420° F.+ Conversion (wt %) | 72 | 78 | 70 |
| Adjusted Temperature, °F., for 70% Conv. at 0.5 LHSV | 924 | 895 | 941 |

As shown in Table 3, the 4:1 wt mixture of Zeolite Beta and REY was 30° F. more active than REY and about 45° F. more active than Beta for achieving a 70% conversion at 0.50 LHSV.

EXAMPLE 3

Gippsland gas oil was cracked in a fluid bed unit. At 70% conversion of 420° F.+ fraction, the physical mixture catalyst of Zeolite Beta and REY gave 11% more gasoline and 1.8% more distillate than Zeolite Beta alone. In addition, $C_1$–$C_4$ gas yield was substantially less. The results are shown in Table 4.

TABLE 4

Feed: Gippsland gas oil
Catalyst: (a) Steamed hydrogen form of Zeolite Beta (alpha value = 3.5, $SiO_2/Al_2O_3$ = 228)
(b) REY zeolite, 12 wt % in a silica-alumina binder

| Catalyst | Zeolite Beta (a) | 4:1 wt mixture (Zeolite Beta/REY) (a) + (b) |
|---|---|---|
| Yields (wt %) | | |
| $C_1 + C_2$ | 0.8 | 0.3 |
| $C_3 + C_4$ | 31.2 | 19.0 |
| Gasoline ($C_5$-420° F.) | 36.8 | 48.4 |
| Distillate (420°-650° F.) | 15.8 | 17.6 |
| Bottoms (650° F.+) | 14.2 | 11.5 |
| Coke | 1.2 | 3.2 |
| 420° F.+ Conversion (wt %) | 70 | 70 |
| Rx Temperature, °F. (°C.) | 941 (505) | 865 (463) |
| LHSV | 0.50 | 0.36 |

EXAMPLE 4

Gippsland gas oil was cracked over conventional REY and a 1:1 wt REY:Zeolite Beta physical mixture catalyst to achieve 46% conversion of 420° F.+ fraction. The octane number of the gasoline is 3.4 RON higher with the mixture catalyst. The mixture catalyst also gave 2 wt % more yield of gasoline+potential alkylate. The results are shown in Table 5.

TABLE 5

Feed: Gippsland gas oil
Catalyst: (a) Steamed hydrogen form of Zeolite Beta (alpha value = 3.5
(b) Conventional REY zeolite, 12 wt % in a silica-alumina binder

| Catalyst | REY (b) alone | 1:1 wt mixture (Zeolite Beta/REY) (a) + (b) |
|---|---|---|
| Temperature, °F. (°C.) | 941 (505) | 941 (505) |
| LHSV* | 0.64 | 2.62 |
| 420° F.+ Conversion (wt %) | 47.5 | 46.0 |

TABLE 5-continued

Feed: Gippsland gas oil
Catalyst: (a) Steamed hydrogen form of Zeolite Beta (alpha value = 3.5
(b) Conventional REY zeolite, 12 wt % in a silica-alumina binder

| Catalyst | REY (b) alone | 1:1 wt mixture (Zeolite Beta/REY) (a) + (b) |
|---|---|---|
| Yields (wt %) | | |
| $C_1 + C_2$ | 0.49 | 0.35 |
| $C_3$ | 0.20 | 0.39 |
| $C_3=$ | 3.04 | 4.31 |
| $i-C_4$ | 0.78 | 0.74 |
| $n-C_4$ | 0.10 | 0.25 |
| $C_4=$ | 2.65 | 4.07 |
| Gasoline ($C_5$-420° F.) | 40.27 | 35.96 |
| Distillate (420°-650° F.) | 30.96 | 29.42 |
| Bottoms (650° F.+) | 19.98 | 23.80 |
| Coke | 1.53 | 0.71 |
| Potential alkylate, % | 12.63 | 18.55 |
| Imported $iC_4$ | 6.16 | 9.43 |
| Gasoline + Alkylate, wt % | 52.9 | 54.5 |
| Clear RON, $C_5+$ Gasoline | 84.0 | 87.4 |

*LHSV based on a catalyst mixture containing 10 wt % of pure Zeolite Beta (100% Zeolite Beta) admixed with 90% Durabead 9A (which contains 12 wt % of REY)

EXAMPLES 5-16

This set of experiments was conducted to evaluate Zeolite Beta as an additive catalyst cracking component for commercial TCC catalysts. Zeolite Beta was extruded with 35 or 50 wt % alumina binder and physically mixed with an equilibrated commercial TCC catalyst (Durabead 9A, substantially an REY zeolite). Various quantities of Zeolite Beta, ranging from 0 to 10 wt % of total catalyst weight, were added, and the alpha activity of the Zeolite Beta was varied between 4 and 418. The Gippsland gas oil, as disclosed in Examples 1-4, was processed over the catalysts. The process conditions and results are listed below in Table 6.

TABLE 6

| | Example | | | | | |
|---|---|---|---|---|---|---|
| | 5 | 6 | 7 | 8 | 9 | 11 |
| Operating Conditions | | | | | | |
| Wtd. Ave. Reactor Temp. °F. | 863 | 875 | 875 | 876 | 872 | 861 |
| LHSV | 3.0 | 2.3 | 1.5 | 2.3 | 2.3 | 2.3 |
| Catalyst/Oil, Wt | 2.1 | 2.7 | 4.2 | 2.7 | 2.7 | 2.7 |
| Product Yields | | | | | | |
| Vol % Conversion | 46.70 | 51.75 | 62.84 | 57.87 | 63.38 | 72.83 |
| Vol % Vac Dist Bottoms | 30.69 | 27.43 | 16.25 | 20.00 | 17.11 | 10.92 |
| Vol % Light Fuel Oil | 22.61 | 20.83 | 20.91 | 22.12 | 19.52 | 16.20 |
| Vol % $C_5+$ Gasoline | 40.48 | 43.70 | 50.56 | 45.72 | 45.29 | 51.48 |
| Vol % $C_4$'s (Total) | 8.49 | 10.96 | 13.66 | 14.60 | 19.33 | 23.89 |
| Wt % Dry Gas ($C_3-$) | 2.87 | 3.85 | 5.17 | 5.10 | 7.43 | 7.43 |
| Wt % Coke | 1.48 | 1.95 | 3.01 | 2.35 | 2.94 | 3.35 |
| Alkylation Yields | | | | | | |
| Vol % Alkylate | 11.07 | 13.61 | 15.53 | 18.78 | 26.17 | 31.22 |
| Vol % Addn $iC_4$ to Alky | 3.57 | 3.77 | 3.23 | 5.70 | 8.64 | 9.80 |
| Vol % $C_5+$ Gaso + Alky | 51.55 | 57.31 | 66.09 | 64.50 | 71.46 | 82.70 |
| Product Specs | | | | | | |
| Octane R + O $C_5+$ Gaso | 81.8 | 82.5 | 82.8 | 86.0 | 87.4 | 87.8 |
| Octane R + O $C_5+$ Gaso + Alky | 84.5 | 85.3 | 85.4 | 88.4 | 89.9 | 90.3 |
| Raw Gaso Octane M + O | — | 74.0 | — | 77.3 | — | 76.7 |
| $C_5+$ Gaso Density at 60° F. | 0.7396 | 0.7629 | 0.7386 | 0.7285 | 0.7125 | 0.7222 |
| LPO Density at 60° F. | 0.8772 | 0.8817 | 0.8915 | 0.8865 | 0.8926 | 0.9041 |
| Catalyst | | | | | | |
| % Zeolite Beta (in catalyst) | 0 | 0 | 0 | 1 | 2 | 5 |
| Alpha Activity (Zeolite Beta) | — | — | — | 418 | 418 | 38 |
| Beta:Y, Wt | 0:1 | 0:1 | 0:1 | 0.9:10 | 1.7:10 | 4.6:10 |
| Beta in Total Zeolite, % | 0 | 0 | 0 | 7.84 | 14.79 | 31.65 |
| Zeolite in Catalyst, % | 12 | 12 | 12 | 12.76 | 13.52 | 15.8 |

TABLE 6-continued

| | | | | | | |
|---|---|---|---|---|---|---|
| WHSV (G Oil/G Zeolite) | 23.75 | 18.17 | 11.83 | 17.08 | 16.12 | 13.8 |
| CAT-D (Y Activity)* | 52 | 52 | 52 | 52 | 52 | 52 |

| | Example | | | | |
|---|---|---|---|---|---|
| | 12 | 13 | 14 | 15 | 16 |
| Operating Conditions | | | | | |
| Wtd. Ave. Reactor Temp. °F. | 859 | 862 | 863 | 859 | 875 |
| LHSV | 2.3 | 3.0 | 3.0 | 3.0 | 2.3 |
| Catalyst/Oil, Wt | 2.7 | 2.1 | 2.1 | 2.1 | 2.7 |
| Product Yields | | | | | |
| Vol % Conversion | 81.21 | 64.33 | 56.79 | 53.09 | 69.44 |
| Vol % Vac Dist Bottoms | 7.44 | 14.73 | 21.51 | — | 11.19 |
| Vol % Light Fuel Oil | 11.36 | 20.94 | 21.69 | — | 19.37 |
| Vol % $C_5^+$ Gasoline | 48.14 | 46.92 | 45.86 | 43.39 | 52.51 |
| Vol % $C_4$'s (Total) | 26.42 | 19.72 | 14.99 | 12.36 | 19.06 |
| Wt % Dry Gas ($C_3^-$) | 14.30 | 6.18 | 4.41 | 3.74 | 7.00 |
| Wt % Coke | 4.83 | 2.71 | 2.10 | 2.19 | 2.85 |
| Alkylation Yields | | | | | |
| Vol % Alkylate | 43.47 | 27.83 | 19.80 | 16.67 | 28.00 |
| Vol % Addn $iC_4$ to Alky | 16.03 | 10.11 | 6.62 | 5.87 | 10.84 |
| Vol % $C_5^+$ Gaso + Alky | 91.60 | 74.75 | 65.66 | 60.06 | 80.50 |
| Product Specs | | | | | |
| Octane R + O $C_5^+$ Gaso | 89.5 | 87.8 | 86.0 | 85.4 | 87.8 |
| Octane R + O $C_5^+$ Gaso + Alky | 91.5 | 90.2 | 88.5 | 87.9 | 90.0 |
| Raw Gaso Octane M + O | — | 76.9 | — | 76.7 | 76.6 |
| $C_5^+$ Gaso Density at 60° F. | 0.7325 | 0.7191 | 0.7328 | 0.7357 | 0.7215 |
| LPO Density at 60° F. | 0.9512 | 0.8941 | 0.8830 | 0.8791 | 0.8943 |
| Catalyst | | | | | |
| % Zeolite Beta (in catalyst) | 10 | 5 | 2 | 5 | 10 |
| Alpha Activity (Zeolite Beta) | 38 | 38 | 38 | 9 | 4 |
| Beta:Y, Wt | 1.04:1 | 4.6:10 | 1.7:10 | 4.5:10 | 1.04:1 |
| Beta in Total Zeolite, % | 51.02 | 31.65 | 14.8 | 31.1 | 51.0 |
| Zeolite in Catalyst, % | 19.6 | 15.8 | 13.52 | 16.08 | 19.60 |
| WHSV (G Oil/G Zeolite) | 11.12 | 18.04 | 21.1 | 17.7 | 11.12 |
| CAT-D (Y Activity)* | 52 | 52 | 52 | 52 | 52 |

*CAT-D activity is a test at standard conditions used to quantify the cracking activity of TCC catalyst bead. The CAT-D activity refers to the volume percent conversion of Mid-Continent Pipe Line Gas Oil (MCPLGO) in a fixed bed reactor at 875° F., 2.3 LHSV, 2.6 C/O (v/v), and 10 minutes run time.

Figure 2:
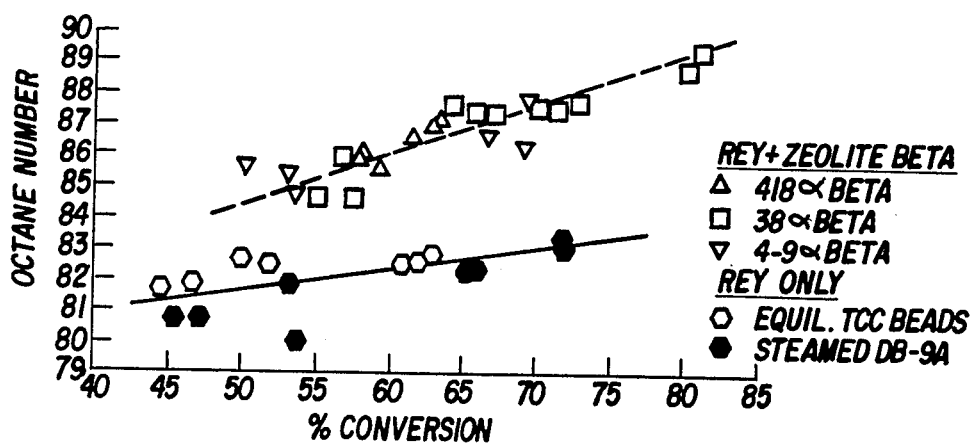
FIG. 2 is a plot illustrating the relationship of octane number of C₅+ gasoline to activity (% conversion) in a catalyst with and without Zeolite Beta.

The results, as illustrated in FIG. 2, show the octane number of the product gasoline for various conversion levels of the feedstock, relative zeolite loadings and the alpha activity of the Zeolite Beta in the catalyst. For example, the increase in octane number obtained is 3–5 at 65% conversion. This represents a marked distinction from conventional TCC catalysts, which show little effect of conversion on gasoline octane number except at very high conversions, i.e., greater than 75%, where overcracking generally occurs. Even at that point the response is slight, as can be seen in FIG. 2.

FIGS. 3a–3e illustrate the relationship between the activity (% conversion) of the catalysts of the present invention and the product yields for gasoline, $C_4$ products, butenes ($C_4^=$), dry gas ($C_3^-$) makes and coke. It can be seen that coke make for the catalysts containing Zeolite Beta are slightly reduced. The dry gas makes and $C_4$ products are slightly increased for catalysts containing Zeolite Beta. It should be noted that the $C_4$ products produced with a Zeolite Beta-containing catalyst are high in $C_4$ olefins and can be used in an alkylation unit to produce more gasoline. Further, the incremental dry gas produced is high in $C_3$ olefins, which can also be used for alkylation. The $C_4$ and dry gas makes are higher for the catalysts with Zeolite Beta having an alpha value of 418 than those with lower alpha values. The gasoline yields are only slightly reduced for Zeolite Beta-containing catalysts with alpha values less than 38. The Zeolite Beta-containing catalysts with alpha values of 418 exhibit larger gasoline yield loss, which accounts for the increased $C_4$ and dry gas make yields.

Figure 4:
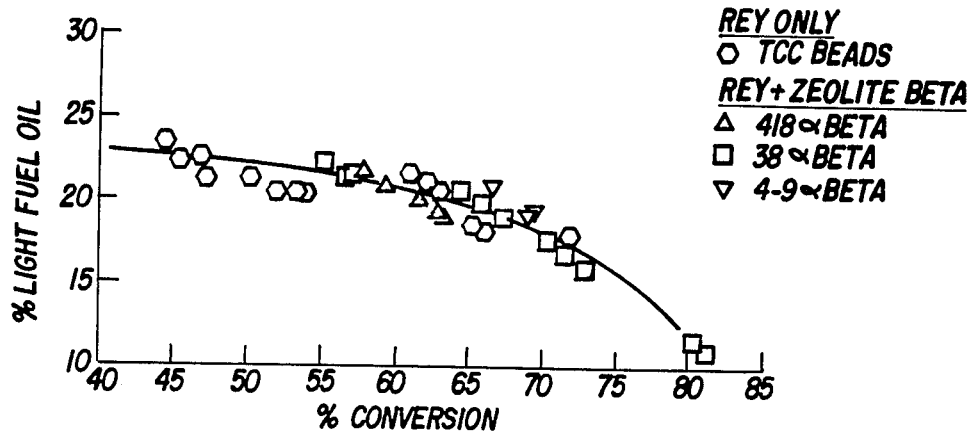
FIG. 4 is a plot illustrating the relationship of light fuel oil (450°-690° F.) yield to activity (% conversion) of a catalyst with and without Zeolite Beta.
Figure 3A:
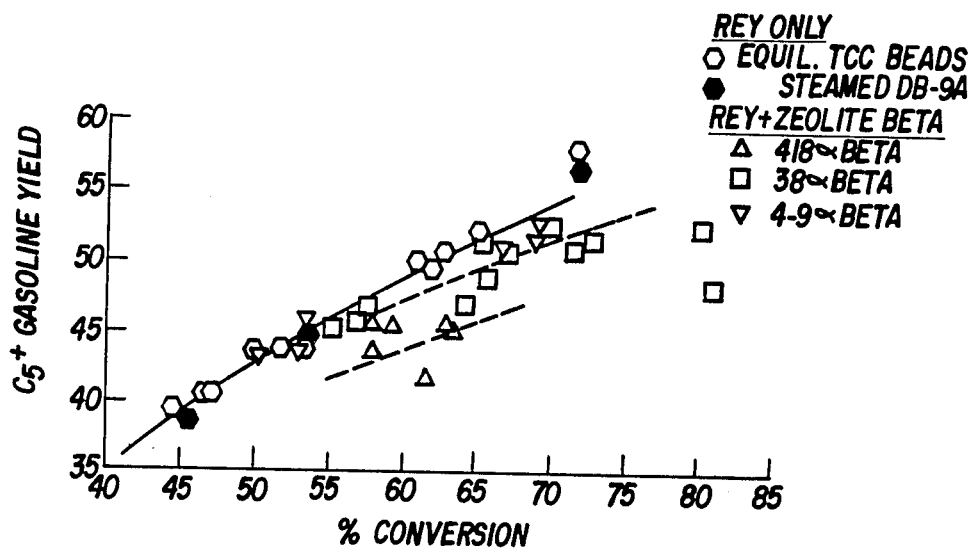
FIG. 3a is a plot illustrating the relationship of C₅+ gasoline yield to activity (% conversion) in a catalyst with and without Zeolite Beta.
Figure 3B:
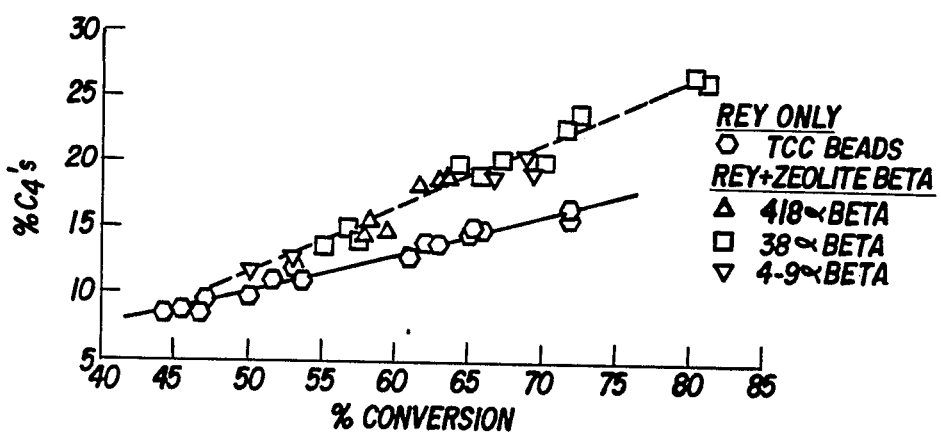
FIG. 3b is a plot illustrating the relationship of total C₄'s yield to activity (% conversion) in a catalyst with and without Zeolite Beta.
Figure 3C:
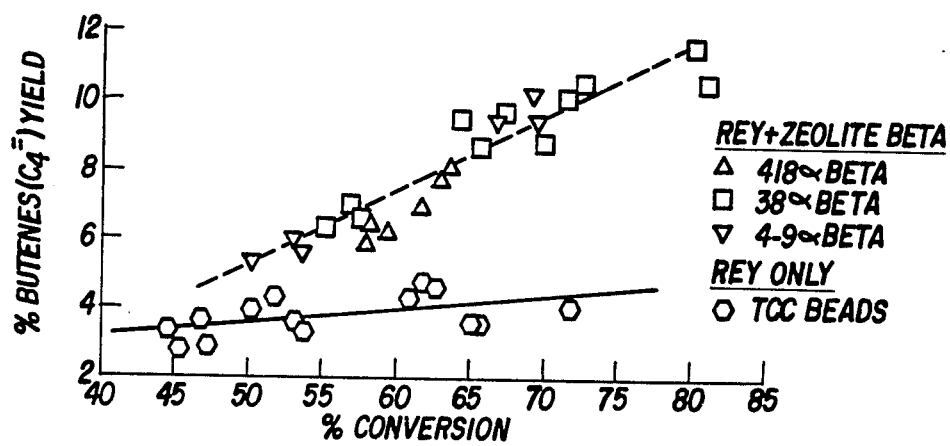
FIG. 3c is a plot illustrating the relationship of butenes (C₄=) yield to activity (% conversion) in a catalyst with and without Zeolite Beta.
Figure 3D:
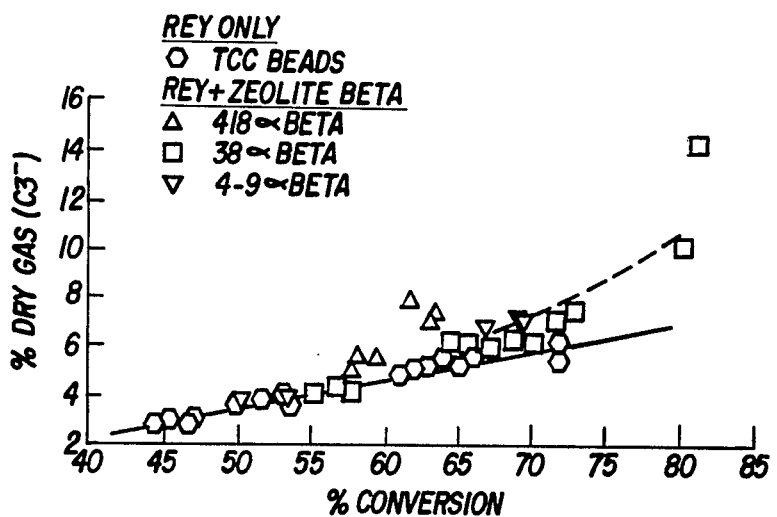
FIG. 3d is a plot illustrating the relationship of dry gas (C₃⁻) yield to activity (% conversion) in a catalyst with and without Zeolite Beta.
Figure 3E:
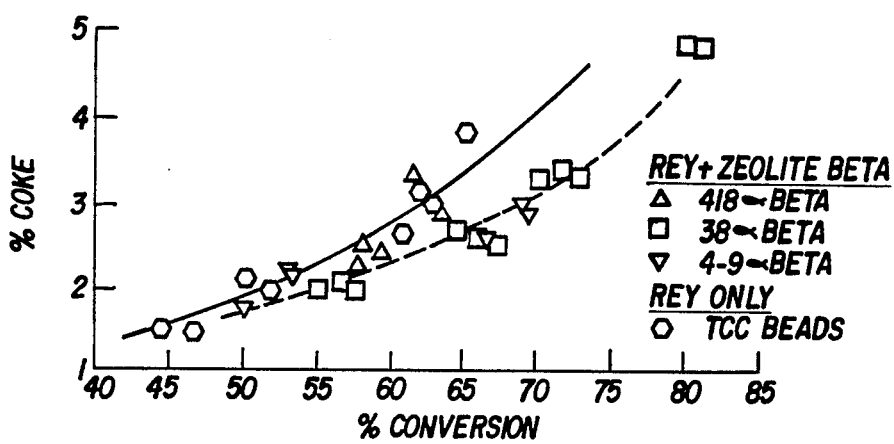
FIG. 3e is a plot illustrating the relationship of coke yield to activity (% conversion) in a catalyst with and without Zeolite Beta.

FIG. 4 illustrates that the yield of Light Fuel Oil (LFO), i.e., those product oils having a boiling point between 420° and 690° F., is essentially the same whether or not Zeolite Beta is added to the conventional TCC catalyst. It can be assumed that the same results would apply to heavy fuel oils, i.e., those product oils having a boiling point higher than 690° F.

Figure 5:
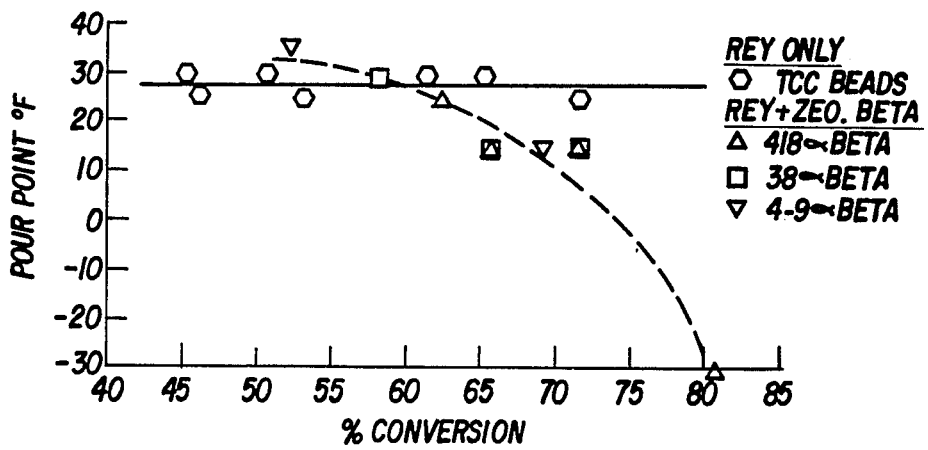
FIGS. 5 and 6 are plots illustrating the effect of a catalyst of the present invention on pour point and cloud point, respectively, on a light fuel oil.
Figure 6:
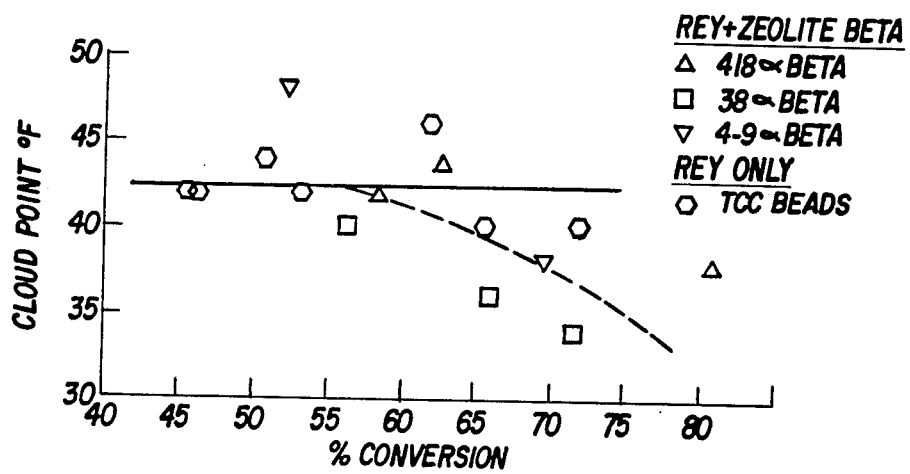
Figure 7:
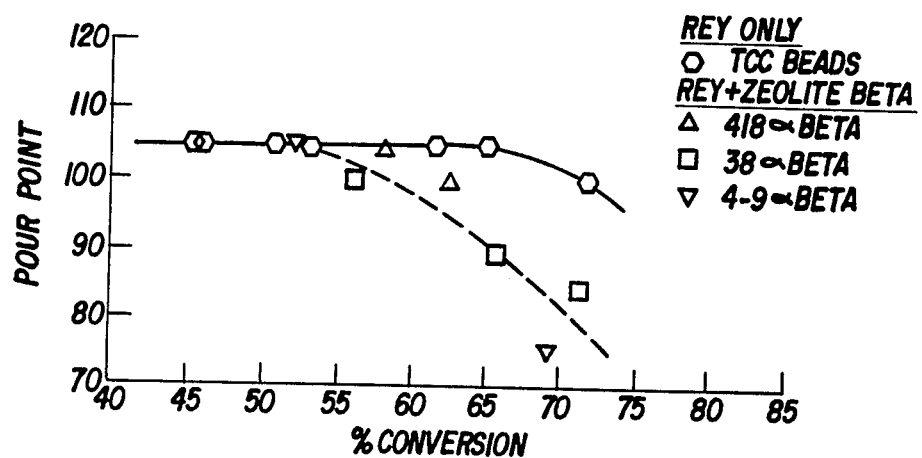
FIG. 7 is a plot illustrating the effect of a catalyst of the present invention on pour point of a vacuum distillate bottom oil.

FIGS. 5–7 illustrate the relationship between pour point and catalyst activity for LFO (FIG. 5), cloud point and catalyst activity for LFO (FIG. 6), and pour point and catalyst activity for vacuum distillate bottoms (VDB) (FIG. 7). In all three figures, advantages can be seen for the addition of Zeolite Beta to the conversion catalyst at conversion levels greater than about 60%.

EXAMPLE 17

Example 17 is designed to illustrate the effect of a composite catalyst comprising Zeolite Beta and REY. The previous examples were directed to physical mixtures of Zeolite Beta and REY. Six wt % Zeolite Beta was composited with 6 wt % REY, formed into a bead-shaped catalyst using silica-alumina as a binder, and steamed at 1290° F. at 1 atm pressure for 12 hours. Gippsland gas oil was cracked in a fixed bed at 925° F. for 5 minutes over the composite catalyst. The results of the composite catalyst run, as well as a comparison run utilizing a fresh commercial sample of REY (Durabead 9A) catalyst, are shown in Table 7.

TABLE 7

|  | Durabead 9A | Beta/REY |
|---|---|---|
| Cat/Oil (g/g) | 2.3 | 2.2 |
| Beta (%)/REY (%) | 0/12 | 6/6 |
| Conversion, Vol % | 65 | 65 |
| $C_5^+$ Gasoline, Vol % | 50.5 | 47.1 |
| Total $C_4$'s, Vol % | 14.0 | 17.2 |
| Dry Gas, Wt % | 6.2 | 7.6 |
| Coke, Wt % | 3.1 | 3.3 |
| RON, $C_5^+$ Gaso | 83.5 | 86.9 |
| $\Delta$RON/$\Delta$Yield | — | 1.0 |
| $C_5^+$ Gaso, °API | 57.4 | 62.3 |
| $C_5^+$ Gaso + Alky, Vol % | 66.5 | 69.7 |
| RON, $C_5^+$ Gaso + Alky | 86.0 | 89.2 |
| iso-$C_4$ Shortfall, Vol % | 4.0 | 7.4 |
| Alkylate, Vol % | 16.0 | 22.6 |
| $C_3^=$, Vol % | 4.5 | 6.3 |
| $C_4^=$, Vol % | 4.9 | 7.4 |
| iso-$C_4$, Vol % | 7.2 | 8.0 |
| LFO, Wt % | 21.7 | 22.3 |
| HFO, Wt % | 15.4 | 15.0 |
| LFO, °API | 23.1 | 27.6 |
| HFO, °API | 26.2 | 18.4 |

The results from Table 7 indicate that the Zeolite Beta/REY catalyst yields an equivalent conversion to REY alone at lower catalyst/oil ratios. Also, the Zeolite Beta/REY composite catalyst improved $C_5^+$ gasoline research octane number (RON), gasoline and alkylate yield and resulted in a higher $C_4^=/C_3^=$ ratio in olefins for potential alkylation, which translates into higher quality alkylates.

EXAMPLE 18

Example 18 illustrates that higher research octane number benefits can be obtained with a composite Zeolite Beta/REY catalyst than with a separate particle mixture when using large TCC bead catalysts, which suffer from diffusional effects. Both catalysts were steamed (100% steam) at 1300° F., 40 psig for 9 hours. Gippsland gas oil was cracked over the catalysts in the same manner as in Example 17. The results are presented below in Table 8.

TABLE 8

|  | Separate | Composite |
|---|---|---|
| Beta (%)/REY (%) | 10/10 | 6/6 |
| Conversion, Vol % | 62.5 | 65 |
|  | $\Delta$'s* | $\Delta$'s |
| $C_5^+$ Gasoline, Vol % | −0.6 | −2.2 |
| Total $C_4$'s, Vol % | +0.9 | +0.3 |
| Dry Gas, Wt % | +1.0 | +0.8 |
| Coke, Wt % | +1.0 | +0.1 |
| RON, $C_5^+$ Gaso | +1.0 | +3.3 |

*$\Delta$'s referenced to base case REY examples at respective conversion levels

EXAMPLE 19

Example 19 illustrates the effect of processing a non-waxy feed (TCC Feedstock, properties listed in Table 9 following) over a Zeolite Beta/REY catalyst and a comparison REY only catalyst.

TABLE 9

| Non-Waxy TCC Feedstock Properties | |
|---|---|
| API Gravity | 22.0 |
| Pour Point, °F. | 85 |
| Conradson Carbon, Wt % | 0.50 |
| Kin. Viscosity at 100° C., cs | 7.21 |
| Aniline Point, °F. | 168 |
| Bromine Number | 8.6 |
| Refractive Index at 70° C. | 1.49 |
| Sulfur, Wt % | 1.75 |
| Nitrogen, ppm | 1600 |
| Nickel, ppm | 0.15 |
| Vanadium, ppm | 0.95 |
| Iron, ppm | 3.6 |
| Copper, ppm | *0.1 |
| Paraffins, Wt % | 18.7 |
| Mono Naphthenes | 9.5 |
| Poly Naphthenes | 15.4 |
| Aromatics | 56.6 |

*Less Than

The catalyst was prepared in the same manner as the catalyst of Example 17. The feedstock was passed over the catalyst in the same manner as in Example 17. The results are listed below in Table 10.

TABLE 10

|  | Durabead 9A | Beta/REY |
|---|---|---|
| Cat/Oil (g/g) | 1.9 | 2.2 |
| Beta (%)/REY (%) | 0/12 | 6/6 |
| Conversion, Vol % | 50 | 50 |
| $C_5^+$ Gasoline, Vol % | 41.5 | 39.0 |
| Total $C_4$'s, Vol % | 8.5 | 9.4 |
| Dry Gas, Wt % | 5.3 | 6.0 |
| Coke, Wt % | 3.3 | 3.8 |
| RON, $C_5^+$ Gaso | 86.6 | 87.8 |
| $\Delta$RON/$\Delta$Yield | — | 0.48 |
| $C_5^+$ Gaso, °API | 54.3 | 52.7 |
| $C_5^+$ Gaso + Alky, Vol % | 52.8 | 53.2 |
| RON, $C_5^+$ Gaso + Alky | 88.2 | 89.3 |
| iso-$C_4$ Shortfall, Vol % | 3.7 | 5.5 |
| Alkylate, Vol % | 11.3 | 14.2 |
| $C_3^=$, Vol % | 3.8 | 4.7 |
| $C_4^=$, Vol % | 3.1 | 4.0 |
| iso-$C_4$, Vol % | 4.1 | 4.3 |
| LFO, 450°-650° F., Vol % | 21.2 | 21.5 |
| HFO, 650° F.+, Vol % | 28.8 | 28.5 |
| LFO, °API | 17.8 | 19.4 |
| HFO, °API | 17.3 | 15.8 |

EXAMPLE 20

Gippsland gas oil was cracked in a fluid bed FCC unit with various mixtures of hydrogen form of Zeolite Beta and a conventional REY catalyst. Table 11 shows the pour points of the 420° F.+ product at 50% conversion of 420° F.+ feed.

TABLE 11

| Feed: | Gippsland 400°-1000° F. gas oil |
|---|---|
| Catalyst: | (a) Hydrogen form of steamed Beta, steamed for 24 hours at 100% steam, 1200° F. and 14.7 psig pressure |
|  | (b) REY zeolite, 12 wt % in a silica-alumina binder |

| Wt Ratio of Zeolite Beta:Y | Pour Point* °F. |
|---|---|
| 0:1 | 90 |
| 0.93:1 | 75 |
| 3.6:1 | 70 |
| 1:0 | 65 |

*At a 420° F.+ Conversion of 50 wt %

Figure 8:
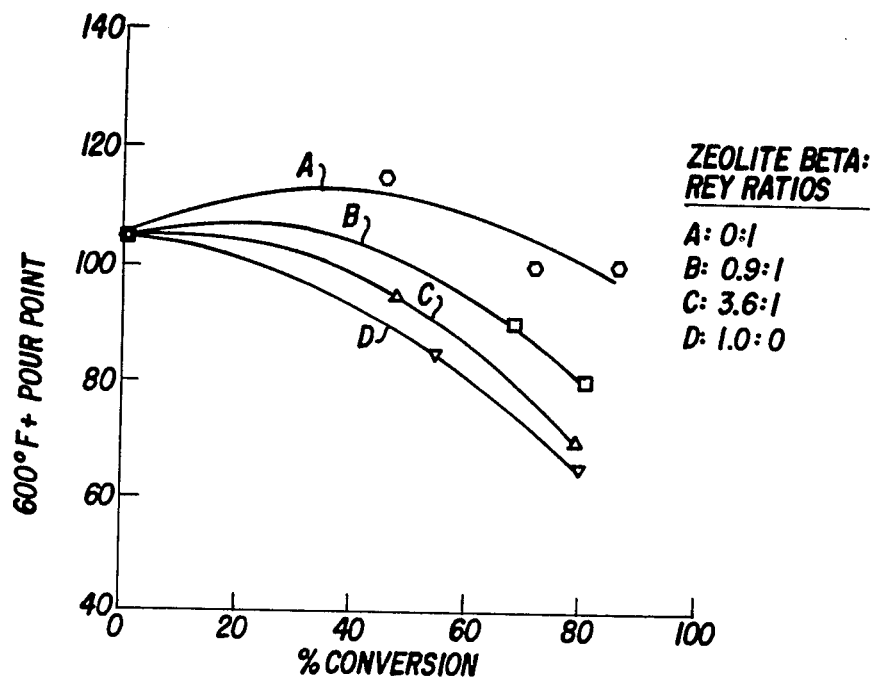
FIG. 8 is a plot illustrating the relationship of 600° F.+ point to activity (% conversion) of catalysts containing varying amounts of Zeolite Beta.

The change in the pour points of 600° F.+ product fraction as a function of 650° F.+ conversion is shown in FIG. 8. The figure clearly shows the benefits for back-end pour point reduction with increasing levels of Zeolite Beta. Increases in 600° F.+ pour point observed with REY alone are absent in the presence of Zeolite Beta.

EXAMPLE 21

Figure 9:
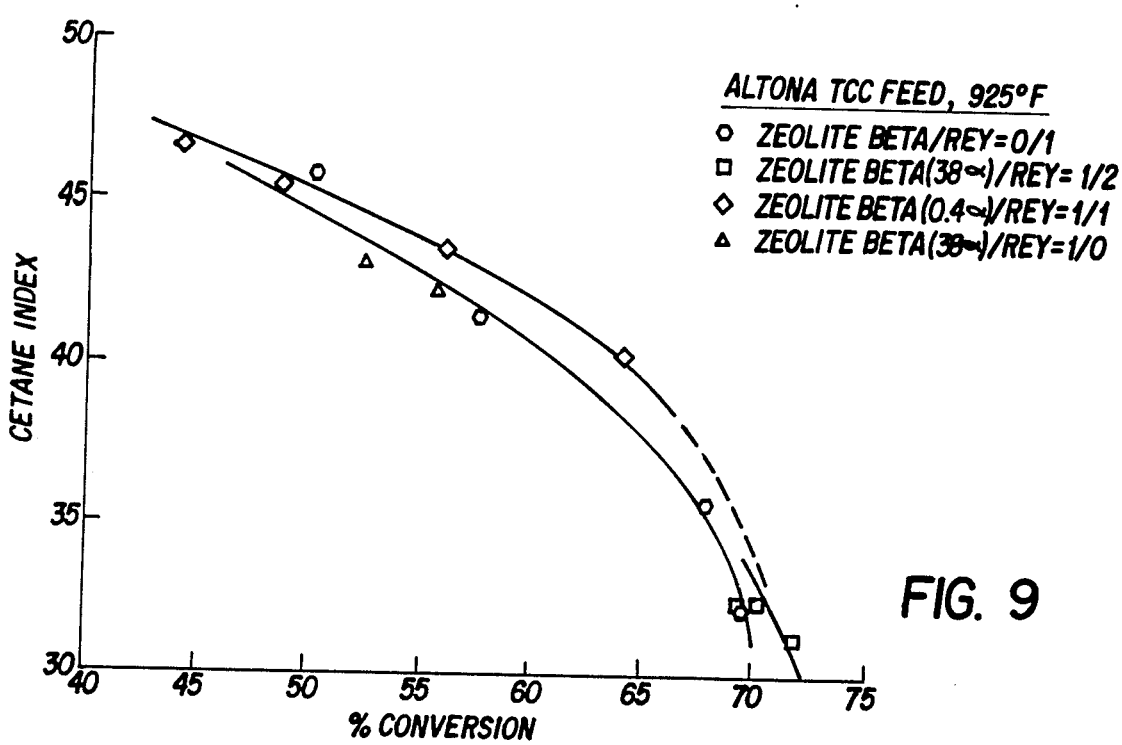
FIG. 9 is a plot illustrating the cetane index versus % gas oil conversion achieved using a rare earth-exchanged zeolite Y, Zeolite Beta, and a mixture thereof.

Gippsland gas oil was cracked in a fixed bed at 925° F. over various zeolites. The LFO distillates were obtained by vacuum distillation of total liquid products. The distillates from mixture catalyst experiments showed better cetane quality than those from REY. The distillates from Beta catalyst alone were of similar cetane quality to REY. The results are shown in Table 12 and FIG. 9.

TABLE 12

| Catalyst | Feed Conversion Vol. % | LFO (450°–690° F.) Distillate Yield, Vol. % | Cetane Index |
|---|---|---|---|
| REY alone | 50.1 | 25.5 | 45.8 |
| | 57.6 | 21.1 | 41.4 |
| | 67.9 | 17.9 | 35.7 |
| | 69.6 | 17.3 | 32.3 |
| Beta (alpha = 38)/REY 1/2 | 69.3 | 17.3 | 32.5 |
| | 70.2 | 17.7 | 32.5 |
| | 71.9 | 16.9 | 31.3 |
| Beta (alpha = 0.4)/REY 1/1 | 44.1 | 26.0 | 46.7 |
| | 48.5 | 25.6 | 45.5 |
| | 55.9 | 23.3 | 43.5 |
| | 64.1 | 21.6 | 40.3 |
| Beta (alpha = 38) alone | 52.3 | 21.3 | 43.1 |
| | 55.5 | 22.3 | 42.3 |

EXAMPLES 22-25

Examples 22-25 illustrate the effect of varying ratios of REY/Zeolite Beta on the octane number when cracking Gippsland gas oil feedstock. REY was contained in standard TCC catalyst beads consisting of 12% zeolite in a silica-alumina binder. Zeolite Beta was steamed at 1000° F., 1 atm. pressure for about 16 hours and extruded with 50 wt % of alumina binder. Experiments were conducted in fixed-bed cracking units using physical mixtures of the two components. The process conditions and results are shown below in Table 13.

TABLE 13

| | Example | | | |
|---|---|---|---|---|
| | 22 | 23 | 24 | 25 |
| Catalysts | | | | |
| REY CAT-D Activity | 52.2 | 52.2 | 52.2 | — |
| Zeolite Beta (alpha activity) | — | 38 | 38 | 38 |
| REY/Zeolite Beta | 1:0 | 2:1 | 1:1 | 0:1 |
| Reaction Conditions | | | | |
| Temperature, °F. | 925 | 925 | 925 | 925 |
| Time-on-Stream, min | 5 | 5 | 5 | 5 |
| Zeolite/Oil, Wt | 0.49 | 0.30 | 0.26 | 0.21 |
| Total Zeolite/Wt oil | | | | |
| Conversion, Vol % | 60 | 60 | 60 | 60 |
| $C_5^+$ Gaso, Vol % | 45.5 | 42.0 | 40.6 | 37.0 |
| Total $C_4$'s, Vol % | 13.0 | 17.5 | 18.9 | 20.7 |
| Dry Gas, Wt % | 6.5 | 6.8 | 7.9 | 9.4 |
| Coke, Wt % | 2.5 | 2.45 | 2.45 | 2.2 |
| RON, $C_5^+$ Gaso | 86.0 | 88.2 | 89.6 | 90.5 |
| $\Delta$RON/$\Delta$Yield | — | 0.63 | 0.73 | 0.53 |
| $C_5^+$ Gaso + Alky, Vol % | 64.0 | 67.5 | 73.0 | 75.0 |
| RON, $C_5^+$ Gaso + Alky | 88.4 | 90.7 | 92.0 | 92.1 |
| iso-$C_4$ Shortfall, Vol % | 6.0 | 10.0 | 14.9 | 19.0 |
| $C_3^=$, Vol % | 5.3 | 6.4 | 9.0 | 10.8 |
| $C_4^=$, Vol % | 5.3 | 9.0 | 10.4 | 12.0 |
| iso-$C_4$, Vol % | 6.2 | 7.1 | 7.0 | 6.8 |
| LFO, Vol % | 22.4 | 20.0 | 18.0 | 20.6 |
| HFO, Vol % | 17.6 | 20.0 | 22.0 | 19.4 |
| LFO Pour, °F. | 30 | 30 | 25 | 25 |
| HFO Pour, °F. | 105 | 100 | 95 | 95 |

Figure 10:
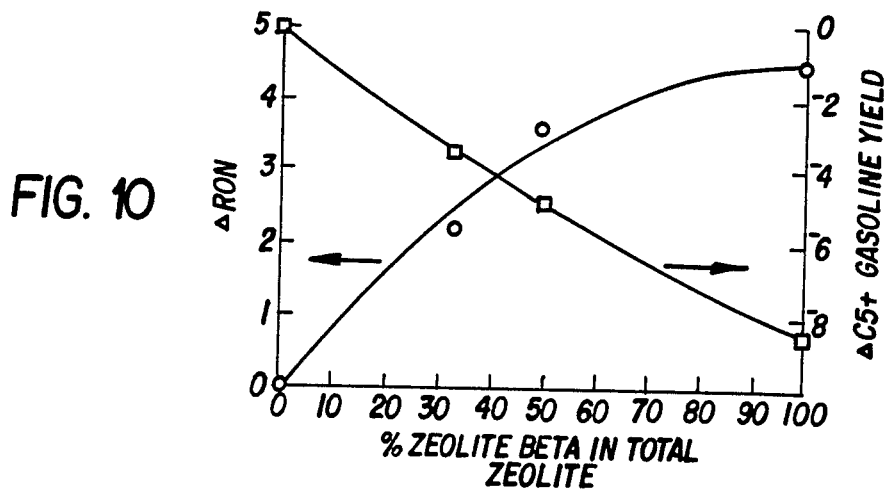
FIGS. 10 and 11 are plots illustrating the effect of increasing amounts of Zeolite Beta in the catalyst of the present invention on gasoline yield and octane differentials, and on octane boost efficiency, respectively.

The data from Table 13 show that the Y zeolite alone produced about 8.5 vol % more gasoline, but at a 4.5 lower clear research octane number than Zeolite Beta alone. FIG. 10 shows all the data, including the intermediate (mixture) cases. Here $\Delta$O = Octane with Zeolite Beta Present-Octane with Zeolite Y Alone $\Delta$Y = Gasoline Yield with Zeolite Beta Present-Gasoline Yield with Zeolite Y Alone ($\Delta$O/$\Delta$Y) is the absolute value of the ratio of the two. As shown, $\Delta$O increases monotonically with increasing Beta loadings. Similarly, $\Delta$Y decreases monotonically with increased Beta loadings.

FIG. 10 clearly illustrates the effects of changing the Zeolite Beta:Y ratio. The gasoline octane number is a function of the level of Zeolite Beta added. Cracking with the Zeolite Beta alone gives 90.5 octane (R+O) gasoline, compared to 86 R+O for the Y alone. On the other hand, gasoline yields follow the opposite trend, and the largest yield loss coincides with the largest octane gain.

Figure 11:
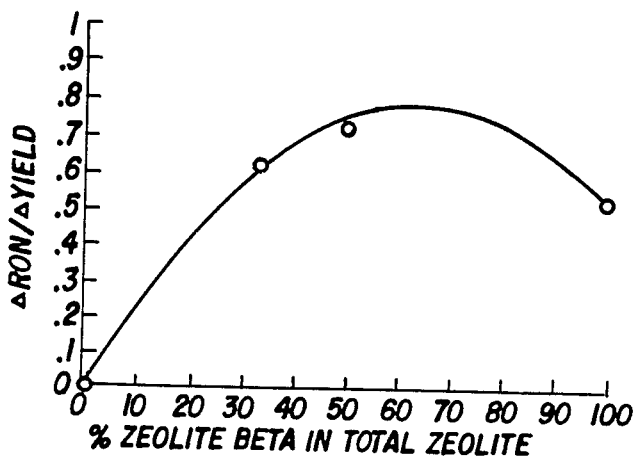

Presenting the $\Delta$O and $\Delta$Y values in FIG. 10 as a ratio ($\Delta$O/$\Delta$Y), as a function of percent Zeolite Beta gives the data shown in FIG. 11. This figure emphasizes the discussion above. The ratio of the two curves ($\Delta$O/$\Delta$Y) shows a maximum near the 50% loading level. This only a coincidence and a function of the conversion level and the two zeolites' relative activities. Note, the ($\Delta$O/$\Delta$Y) curve is higher than would be expected by a linear blending (based on the catalyst loading) of the two extreme cases.

One possible way of trying to define preferred levels is to look at the efficiency of gaining octane in terms of:

$$\frac{\Delta O}{\Delta Y} = \frac{\text{octane gain}}{\text{gasoline yield loss}}$$

This is shown in FIG. 11. The efficiency appears to reach a maximum near 1:1 ratios of Beta:Y in this particular example.

In conclusion, the catalyst of the present invention offers a superior method for catalytic cracking feedstocks. Further, the improved catalyst offers a large gasoline octane boost with small yield penalty. The catalyst also offers a potential activity advantage over conventional catalysts used for TCC and FCC processes. Improved dewaxing activity results in reduced pour and cloud points of light and heavy fuel oil fractions relative to conventional cracking catalysts.

Although the invention has been described in conjunction with a specific embodiment, it is evident that many alternatives and variations will be apparent to those skilled in the art in light of the foregoing description. Accordingly, the invention is intended to embrace all of the alternatives and variations that fakll within the spirit and scope of the appended claims.

We claim:

1. A catalytic cracking process which comprises catalytically cracking a hydrocarbon feed in the absence of added hydrogen with a cracking catalyst comprising zeolite beta component and a faujasite component comprising at least one crystalline aluminosilicate of the faujasite structure, the weight ratio of the faujasite component to the zeolite beta component being from 1:25 to 20:1.

2. A process according to claim 1 in which the weight ratio of the faujasite component to the zeolite beta component is from 1:4 to 5:1.

3. A process according to claim 1 in which the faujasite component comprises zeolite X or zeolite Y.

4. A process according to claim 1 in which the faujasite component comprises zeolite Y, zeolite REY or zeolite USY.

5. A process according to claim 1 in which the zeolite beta component is acid zeolite beta or rare earth zeolite beta.

6. A process according to claim 5 in which the zeolite beta has a silica:alumina mole ratio from 10:1 to 500:1.

7. A process according to claim 6 in which the zeolite beta has a silica:alumina mole ratio from 50:1 to 250:1.

8. A process according to claim 1 in which the cracking catalyst comprises a composite of the zeolite beta component and the faujasite component.

9. A process according to claim 8 in which the composite comprises a porous matrix in addition to the zeolite beta component and the faujasite component.

10. A process according to claim 9 in which 10 to 70 weight percent of the composite comprises the zeolite components.

11. A process according to claim 8 in which the catalytic cracking is carried out in a moving bed.

12. A process according to claim 9 in which the catalytic cracking is carried out in a moving bed.

13. A process according to claim 10 in which the catalytic cracking is carried out in a moving bed.

14. A process according to claim 1 in which the cracking catalyst comprises the zeolite beta component and the faujasite component as separately matrixed components of a mixture.

15. A process according to claim 14 in which the catalytic cracking is carried out as a fluid catalytic cracking process.

16. A process according to claim 14 in which the catalytic cracking is carried out as a fluid catalytic cracking process.

17. A process according to claim 1 in which said process is carried out at a temperature of 840° to 1050° F.

18. A process according to claim 1 in which the hydrocarbon feed has an initial boiling point of at least 400° F. and an end point of at least 850° F.

19. A process for cracking a gas oil to produce a gasoline product of improved octane rating, which comprises catalytically cracking a hydrocarbon feed in the absence of added hydrogen with a cracking catalyst comprising zeolite beta component and a faujasite component comprising at least one crystalline aluminosilicate of the faujasite structure, the weight ratio of the faujasite component to the zeolite beta component being from 1:2 to 20:1.

20. A process according to claim 19 in which the weight ratio of the faujasite component to the zeolite beta component is from 60:40 to 30:70.

21. A process according to claim 19 in which the faujasite component comprises zeolite Y, zeolite REY or zeolite USY.

22. A process according to claim 19 in which the cracking catalyst comprises a composite of the zeolite beta component and the faujasite component in a porous matrix.

23. A process according to claim 19 in which the cracking catalyst is a moving-bed bead cracking catalyst comprising a composite of the zeolite beta component and the faujasite component in a porous matrix.

24. A process according to claim 19 in which the cracking catalyst is a fluid cracking catalyst comprising a mixture of the zeolite beta component and the faujasite component as separately matrixed components of the mixture.

25. A process according to claim 19 in which the weight ratio of the zeolite beta component to the faujasite component is selected according to the activity ratio of the two components such that the octane efficiency of the cracking process is maximized.

26. A process for simultaneously cracking and dewaxing a hydrocarbon feed to produce cracked products including distillate of improved cetane number and pour point, the process comprising catalytically cracking a hydrocarbon feed in the absence of added hydrogen with a cracking catalyst comprising zeolite beta component and a faujasite component comprising at least one crystalline aluminosilicate of the faujasite structure, the weight ratio of the faujasite component to the zeolite beta component being from 1:25 to 3:1.

27. A process according to claim 26 in which the weight ratio of the faujasite component to the zeolite beta component is from 1:5 to 2:1.

28. A process according to claim 26 in which the weight ratio of the faujasite component to the zeolite beta component is from 1:4 to 1:1.

29. A process according to claim 26 in which the cracking catalyst comprises a composite of the zeolite beta component and the faujasite component in a porous matrix.

30. A process according to claim 26 in which the cracking catalyst is a moving-bed bead cracking catalyst comprising a composite of the zeolite beta component and the faujasite component in a porous matrix.

31. A process according to claim 26 in which the cracking catalyst is a fluid cracking catalyst comprising a mixture of the zeolite beta component and the faujasite component as separately matrixed components of the mixture.

32. A process according to claim 31 in which each component of the mixture includes a porous matrix material.

33. A process according to claim 26 in which the weight ratio of the zeolite beta component to the faujasite component is selected according to the activity ratio of the two components such that the octane efficiency of the cracking process is maximized.

34. A process according to claim 26 in which the faujasite component comprises zeolite Y, zeolite REY or zeolite USY.

* * * * *